F. A. WARD.
SPLINED SHAFT.
APPLICATION FILED MAY 7, 1918.

1,273,016.

Patented July 16, 1918.
2 SHEETS—SHEET 1.

Inventor:
Frederick Alexander Ward,
By D. Anthony Usina Attorneys.

F. A. WARD,
SPLINED SHAFT.
APPLICATION FILED MAY 7, 1918.
1,273,016.
Patented July 16, 1918.
2 SHEETS—SHEET 2.
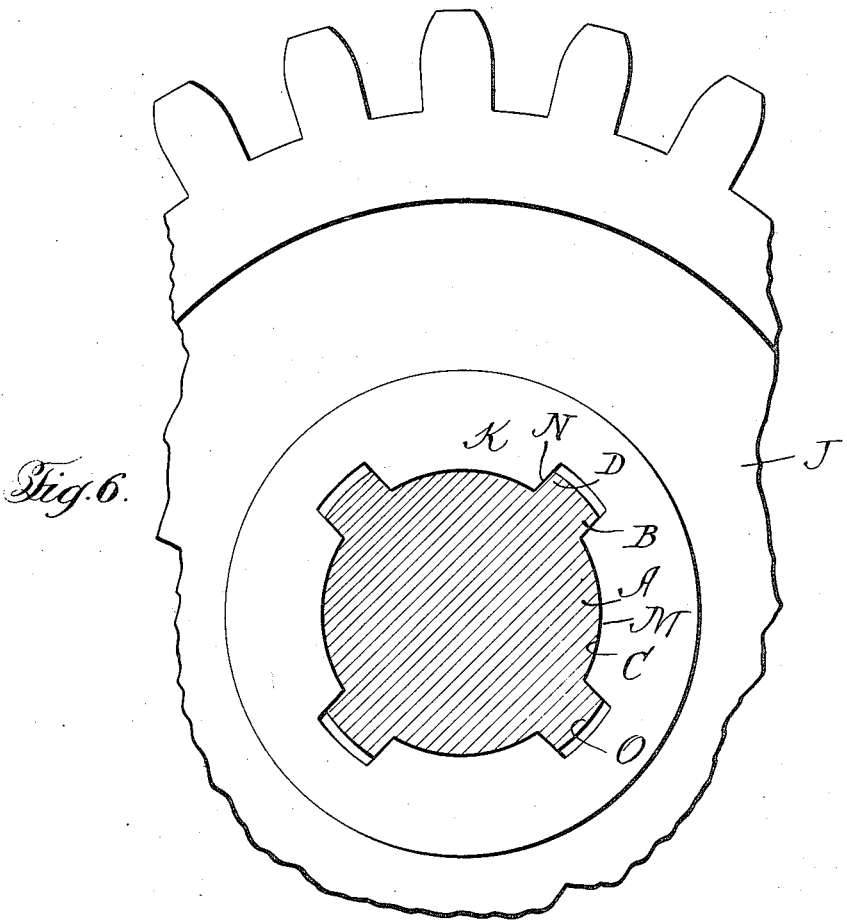
Fig. 6.
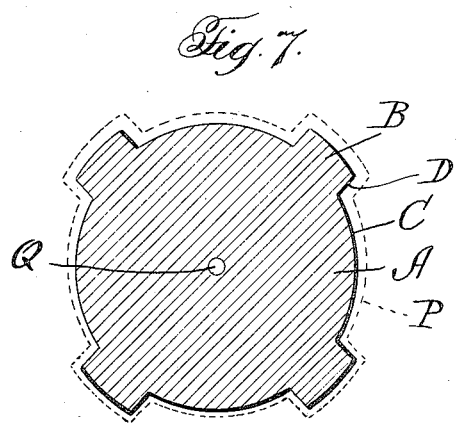
Fig. 7.
Inventor:
Frederick Alexander Ward,
By
Attorneys:

UNITED STATES PATENT OFFICE.

FREDERICK A. WARD, OF DETROIT, MICHIGAN, ASSIGNOR TO THE GEAR GRINDING MACHINE COMPANY, A CORPORATION OF MICHIGAN.

SPLINED SHAFT.

1,273,016.  Specification of Letters Patent.  Patented July 16, 1918.

Original application filed August 13, 1912, Serial No. 714,810. Divided and this application filed May 7, 1918. Serial No. 233,088.

*To all whom it may concern:*

Be it known that I, FREDERICK A. WARD, citizen of the United States, residing in Detroit, Michigan, have invented certain new and useful Improvements in Splined Shafts, of which the following is a specification.

The invention relates to shafts and related parts such as are used in automobile transmissions of the selective type and in various other mechanisms, the present application being a division of a previous application filed by me August 13, 1912, Serial No. 714,810. The purpose of the invention is to provide a shaft with bearing faces which are hardened and are nevertheless perfectly true longitudinally and transversely at all points throughout their extent and which bearing faces are selected so as to facilitate the provision of coördinated faces on the gear or other sliding member which may also be hardened and accurately centered and formed.

The accompanying drawings illustrate an embodiment of the invention and the mode of producing the shaft.

Fig. 6 is a section of a shaft with a segment of a sliding gear thereon; and

Fig. 7 is a transverse section showing a comparison between the outlines before and after grinding.

Referring now to the accompanying drawings the shaft A is shown provided with four splines B distributed about the axis at equal angles. Between the splines are curved (usually cylindrical) segments C and the sides D of the grooves, or flanks of the splines, are parallel to each other and positioned to give splines of exact and equal thickness.

My improved method of grinding such articles (covered in the aforesaid application) consists, generally speaking, in first trimming a grinding medium into exact conformity to one side or segment of the finished structure; and in then alternately reciprocating and rotatively adjusting the work with respect to the grinder to successively grind the faces thereof symmetrical with the longitudinal axis, and in gradually adjusting the grinder toward the work or vice versa until the latter is reduced to finished size. During this operation the grinder is restored to form as frequently as found necessary to maintain its form and the fashioned surface as finished includes the sides of the splines as well as the cylindrical or curved segments.

Figure 1:
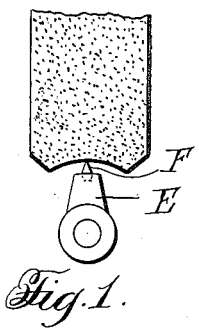
Figures 1 and 2 are diagrammatic sections illustrating the operations of trimming the grinder.
Figure 2:
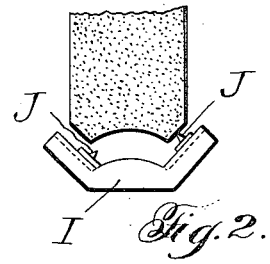
Figure 3:
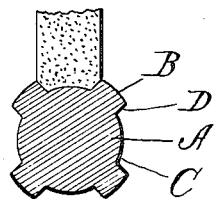
Fig. 3 illustrates the grinding of the splined shaft with the accurately formed grinding medium.
Figure 4:
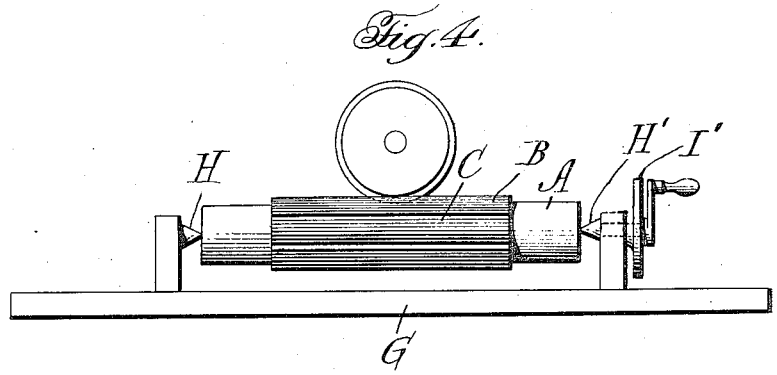
Fig. 4 is a diagrammatic side elevation of a machine on which the work and trimming mechanism are located.
Figure 5:
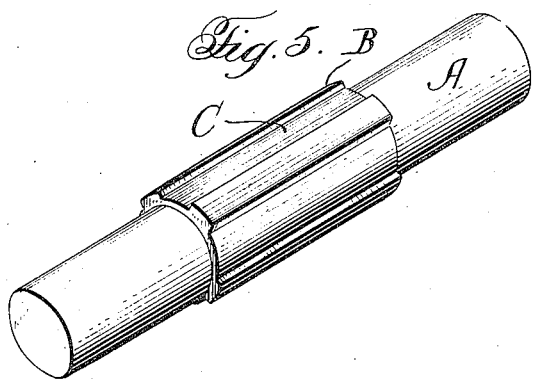
Fig. 5 is a perspective view of the completed work.

In Fig. 1, the operation of trimming the segmental surface of the grinder is illustrated, this being accomplished by a pivoted trimming tool E provided preferably with a diamond point F and of a radius exactly corresponding to that of the finished work. The tool E may be mounted upon the work table or bed $g$ in alinement with the centers H and H' on which the work is mounted, and thus after trimming of the grinder it may be engaged with the work in precise relative position.

The trimming of the grinding surface which fashions the sides of the splines, is preferably accomplished by a separate toolholder I have angling sides corresponding to the angles of the finished work and adjustable trimmer points J which may be reciprocated on said sides to trim the wheel.

One of the centers H' on which the work is mounted is connected with an indexing mechanism I', the spindle of which may be rotatively adjusted to the exact angle desired.

An apparatus for carrying out the process is illustrated in detail in my Patent No. 1,155,532 dated October 5, 1915. Other grinding apparatus and processes may be used but those above described are preferred.

In producing my improved shaft the rod of comparatively soft metal is milled or otherwise shaped to the design shown and approximately to size, leaving on all the surfaces which are subsequently to be ground an extra thickness of stock such that (even allowing for the distortion of the subsequent heat treatment) at all points in the length and breadth of these surfaces there will be some stock to be removed in order to bring them down to the exact dimensions desired. This shaft is then hardened by heat treatment to a depth sufficient to include the surplus stock referred to. Such thorough heat treatment will in most cases distort the shaft by bending and in other ways. The shaft thus milled and hardened is put into the machine and the grinding wheel is trued to form by the trimmers I and J. The wheel and work to be ground are then adjusted into operative relationship with each other, and the one or the other is alternately reciprocated in a longitudinal direction with the axis of the work, and the work is rotatively adjusted respectively by the operation of the indexing mechanism I. Thus instead of grinding each side to finished size before operating upon another side, the same grinding cut is taken successively over all the sides before any change in adjustment for another cut. This sequence of operations has the advantage, first, that the heating effect produced by grinding is uniformly distributed over the shaft, which prevents any warping action, and secondly, it permits the operator to gradually reduce the work to finish size, testing from time to time with a micrometer or other gage.

Before the final cut, reducing the work to size, the grinder medium is preferably reformed so as to impart to the finished work the exact form as predetermined.

In a previous patent of myself and Taylor No. 1,104,589 there is disclosed a method of grinding the teeth of gears by means of a grinding wheel which passes between the teeth. Such grinding of the gears for automobile transmissions and the like has been practised for some years prior to this application and has produced a substantial improvement in such transmissions. But a satisfactory shaft for the sliding gear has not been available prior to this invention and without such a shaft it has been impossible to secure a quiet transmission. Splined shafts were defective because if hardened by heat treatment they were always badly distorted, and if not so hardened they were soon worn or their surfaces injured by the sliding of the hardened gears thereon. In the best transmissions resort was had to square shafts because these after heat treatment could be ground on their flat faces by old and known methods. These are objectionable for two reasons; first, they require a correspondingly square hole with ground faces through the hub of the gear which is expensive and difficult to make and, second, the bearing surfaces of the gear on the shaft are at an extreme angle to the line of pressure in the rotation of the gear in use; whereas with a splined shaft, the gear hub has a round hole through it which can be easily ground with great accuracy and the radial (or approximately radial) sides of the splines provide a perfect bearing surface normal to the direction of pressure of the gear on the shaft during rotation.

Splined shafts were also used which were hardened and ground on the outer cylindrical faces of the splines because such faces could be ground on the well known cylindrical grinding machines, but the bottoms of the broached grooves in the gear hubs could not be commercially ground and without this an exact bearing on the outer faces of the splines could not be secured. But there was no known way of making splined shafts which should be as hard as the gears sliding thereon and should be exactly straight and true to dimensions and which should provide a perfect bearing for a portion of the gear which could also be ground and centered accurately at a reasonable cost.

In splined shafts, the sides of the space (flanks of the splines) are flat and the distance between them must be maintained rigidly to prevent looseness of the gear, which would injure the sliding bearing surfaces. In good practice the spacing of such flanks from each other is held within a thousandth of an inch or less. And the bottom of the groove between splines must be accurately shaped and located with respect to the center of the shaft. The flat side faces of the ribs must also be carried down to or aproximately to the circular line of the bottoms of the grooves. Furthermore the exactness referred to must be maintained throughout the length of the splined portion of the shaft, and the tendency of a shaft to bend in the plane of its length during its cutting and heat treatment is a matter known to skilled persons in this art.

Fig. 6 illustrates the relations between a shaft A and a gear J having a hub K sliding thereon. The ground bottoms C of the grooves on the shaft are fitted exactly to the corresponding ground faces M of the gear hub, and the four faces are equidistant from the center of the shaft. The flat faces D of the splines are ground and so accurately spaced as to make a perfect sliding fit with the sides N of the broached grooves in the gear hub. The outer faces O of the splines are clear of the opposed faces of the hub and need not be ground, though they usually are ground by an easy cylindrical grinding operation.

I believe that such a splined shaft itself, hardened by heat treatment or otherwise made so hard that it cannot be cut to shape, and then shaped by grinding to produce bearing faces C accurately shaped and symmetrically located with reference to the axis, and this throughout its length, is new; and that it is further new to provide such a shaft with the side bearing surfaces D ground flat and straight from end to end from their inner to their outer edges and accurately and equally spaced from each other.

In efforts to obtain a satisfactory splined heat-treated shaft it has also been proposed to make the splines separately and to set them in grooves in the shaft after grinding the circular faces of the shaft on the well known cylindrical grinders. Shafts formed initially as nearly as possible to the exact dimensions ultimately required and then heat-treated have been used where an imperfect, sloppy, fit is acceptable. And where one of these shafts has been found to stick at one or more points in its length the high spots thus located have been ground down by loose abrading material rubbed between the shaft and the sliding gear, but this has not been a regular commercial practice, being only an expedient used on an occasional shaft. It is too slow and expensive for regular use and has not produced a shaft which is straight and of uniform diameter and exact symmetry about its axis throughout its length. See Fig. 7, where A is the finished shaft and P indicates in dotted outline the cross-section at this point before grinding. Suppose this section taken at the point where the distortion by heat treatment has produced the greatest eccentricity. According to my process all the faces C and D are ground down to an exact radial distance from the true axis Q and in exact angular relation with each other throughout the length of the shaft, even though at one cross-section the outline is at P and at another cross-section in some other position, and this involves, of course, leaving on the shaft before hardening sufficient stock for the subsequent grinding operations at all points. But in the hand rubbing and similar operations referred to the shaft has been milled or hobbed to final size and heat-treated with the greatest care to minimize distortion and then such shafts as did not slide freely through a test gear were rubbed or ground merely to remove the high spots here and there,—producing a shaft always small enough, generally too small at one or more points along its length and almost never quite straight and true with relation to its axis of revolution.

The member which is mounted on the splined shaft may be not only a gear, as above described, but any one of various other devices whose center has to coincide accurately with the central axis of the shaft on which it is carried. And while the invention is of particular value in the case of members which have a sliding fit and are intended in operation to slide on the shaft, it is of great value also where the member is mounted at a fixed point in the length of the shaft, as for example, by a press fit. In the case of a sliding or a non-sliding gear or other member, the important point is to locate the center of operation of such a member on the axis of rotation of the shaft, and this is perfectly accomplished by the accuracy with which the bottoms of the grooves on the shafts and the complementary faces of the bore of the gear are finished.

Modifications may be made in the details of the shaft and in the described method of manufacture and grinding without departure from the invention as defined in the following claims. The bearing faces between the splines, for example, need not include the entire width of the shaft between the splines, though such a wide bearing face is generally best. And these bearing faces, while they are preferably circular and identical with one another and symmetrically located about the axis, need not be true circular arcs and need not be struck from the shaft axis as a center, and are not in all cases necessarily identical with one another and symmetrically located. It is possible, by suitably modifying the usual circular bore and regular location of the broached grooves in the hub of the gear or other sliding member, to use a shaft in which the splines are not symmetrically located and the bearing faces between the splines are not truly circular arcs struck from the axis of the shaft.

What I claim is—

1. A shaft of hardened steel having integral projecting splines with grooves between them, the bottoms of the grooves forming curved bearing faces, which bearing faces are ground to finished dimensions at all points in their length and width.

2. A shaft of hardened steel having integral projecting splines with grooves between them, the bottoms of the grooves forming curved bearing faces, which bearing faces are ground at all points in their length and width, and which are symmetrically located with reference to the axis of the shaft throughout their length.

3. A shaft made of steel with integral splines having substantially or approximately radial flanks, said shaft being hardened by heat treatment, the bottoms of the grooves between the splines forming curved bearing faces which are ground at all points in their length and width and are symmetrically located with reference to the axis of the shaft throughout their length.

4. A shaft made of steel with splines having substantially or approximately radial flanks, said shaft being hardened by heat treatment, the bottoms of the grooves between the splines forming curved bearing faces which are ground at all points in their length and width and are symmetrically located with reference to the axis of the shaft throughout their length, the flanks of the splines being parallel to the axis of the shaft and being also ground straight from end to end and from their bottom to their top edges.

5. A shaft of hardened steel having integral projecting splines with grooves between them, the bottoms of the grooves forming curved bearing faces, which bearing faces are ground at all points in their length and width, and which are symmetrically located with reference to the axis of the shaft throughout their length, in combination with a member mounted on the splined portion of said shaft and having a bore with ground faces symmetrical with the center of said member and corresponding with the bottoms of the grooves in the shaft so as to center said member accurately with the central axis of the shaft.

In witness whereof I have hereunto signed my name.

FREDERICK A. WARD.